US012567587B2

(12) United States Patent
Sasagawa et al.

(10) Patent No.: US 12,567,587 B2
(45) Date of Patent: Mar. 3, 2026

(54) BINDER AQUEOUS SOLUTION FOR POWER STORAGE DEVICE, SLURRY FOR POWER STORAGE DEVICE, ELECTRODE FOR POWER STORAGE DEVICE, SEPARATOR FOR POWER STORAGE DEVICE, SEPARATOR/ELECTRODE LAMINATE FOR POWER STORAGE DEVICE AND POWER STORAGE DEVICE

(71) Applicant: ARAKAWA CHEMICAL INDUSTRIES, LTD., Osaka (JP)

(72) Inventors: Naoki Sasagawa, Ibaraki (JP); Shinji Ozaki, Ibaraki (JP); Satoru Aoyama, Ibaraki (JP); Katsuya Okubo, Ibaraki (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 656 days.

(21) Appl. No.: 17/947,177

(22) Filed: Sep. 19, 2022

(65) Prior Publication Data

US 2023/0110098 A1 Apr. 13, 2023

(30) Foreign Application Priority Data

Sep. 29, 2021 (JP) ................................ 2021-159979

(51) Int. Cl.

| | |
|---|---|
| ***H01M 50/46*** | (2021.01) |
| ***H01M 4/04*** | (2006.01) |
| ***H01M 4/62*** | (2006.01) |
| ***H01M 50/423*** | (2021.01) |

(52) U.S. Cl.

CPC ......... *H01M 4/622* (2013.01); *H01M 4/0404* (2013.01); *H01M 50/423* (2021.01); *H01M 50/46* (2021.01)

(58) Field of Classification Search

CPC ...... H01M 4/622; H01M 4/62; H01M 50/423; H01M 50/46

See application file for complete search history.

(56) References Cited

U.S. PATENT DOCUMENTS

| | | | | |
|---|---|---|---|---|
| 2016/0344007 A1 | | 11/2016 | Toyoda et al. | |
| 2020/0243861 A1 | * | 7/2020 | Yamamoto .......... | H01M 50/443 |

FOREIGN PATENT DOCUMENTS

| | | | | |
|---|---|---|---|---|
| EP | 3823084 | | 5/2021 | |
| JP | 2018006333 | | 1/2018 | |
| JP | 2019057486 A | * | 4/2019 | ........ H01M 10/0525 |
| JP | 2019057487 | | 4/2019 | |
| WO | 2015008626 | | 1/2015 | |
| WO | 2015122322 | | 8/2015 | |

OTHER PUBLICATIONS

Machine Translation of: JP 2019-057486 A, Ozaki et al., Apr. 11, 2019.*

"Search Report of Europe Counterpart Application", issued on Jan. 27, 2023, p. 1-p. 7.

"Office Action of Korea Counterpart Application", issued on Oct. 15, 2025, with English translation thereof, pp. 1-16.

* cited by examiner

*Primary Examiner* — Kenneth J Douyette

(74) *Attorney, Agent, or Firm* — JCIPRNET

(57) ABSTRACT

A binder aqueous solution for power storage device, a slurry for power storage device, an electrode for power storage device, a separator for power storage device, a separator/electrode laminate for power storage device and a power storage device are provided. The present disclosure provides a binder aqueous solution for power storage device, in which the binder aqueous solution for power storage device contains a water-soluble polymer, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is less than 300,000.

8 Claims, No Drawings

BINDER AQUEOUS SOLUTION FOR POWER STORAGE DEVICE, SLURRY FOR POWER STORAGE DEVICE, ELECTRODE FOR POWER STORAGE DEVICE, SEPARATOR FOR POWER STORAGE DEVICE, SEPARATOR/ELECTRODE LAMINATE FOR POWER STORAGE DEVICE AND POWER STORAGE DEVICE

CROSS-REFERENCE TO RELATED APPLICATION

This application claims the priority benefit of Japanese Application Serial No. 2021-159979, filed on Sep. 29, 2021. The entirety of each of the above-mentioned patent application is hereby incorporated by reference herein and made a part of this specification.

BACKGROUND

Technical Field

The present disclosure relates to a binder aqueous solution for power storage device, a slurry for power storage device, an electrode for power storage device, a separator for power storage device, a separator/electrode laminate for power storage device and a power storage device.

Description of Related Art

An electrode for power storage device is repeatedly charged and discharged and changes in volume (spring back) from the beginning. In order to reduce spring back, a binder is used.

In addition, in a separator of a power storage device, a binder is used in order to maintain adhesion between a coating layer (heat-resistant layer) and a base material.

A slurry for power storage device contains a binder and a solvent. The applicant is studying a method for using a water-soluble polymer as a binder.

PATENT DOCUMENTS

[Patent Document 1] Japanese Patent Laid-Open No. 2018-006333

At the time of handling a binder aqueous solution for power storage device, the binder aqueous solution for power storage device is required to have favorable coatability and dispersion stability.

SUMMARY

The following items are provided by the present disclosure.

Item 1

A binder aqueous solution for power storage device, in which the binder aqueous solution for power storage device contains a water-soluble polymer, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is less than 300,000.

Item 2

A slurry for power storage device, in which the slurry for power storage device contains a water-soluble polymer, water and an electrode active material or a non-conductive particle, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is less than 300,000.

Item 3

An electrode for power storage device having a dried substance of the slurry for power storage device according to the above-described item on a current collector.

Item 4

A separator for power storage device having a dried substance of the slurry for power storage device according to the above-described item on a base material.

Item 5

A separator/electrode laminate for power storage device having a dried substance of the slurry for power storage device according to the above-described item on an active material side of an electrode.

Item 6

A power storage device including one or more selected from the group consisting of the electrode for power storage device according to the above-described item, the separator for power storage device according to the above-described item and the separator/electrode laminate for power storage device according to the above-described item.

In the present disclosure, one or a plurality of characteristics described above may be provided not only in the listed combinations but also in additional combinations.

DESCRIPTION OF THE EMBODIMENTS

According to an embodiment of the disclosure, a binder aqueous solution for power storage device having favorable coatability and dispersion stability is provided.

The present inventors found that the use of a specific component provides a binder aqueous solution for power storage device having favorable coatability and dispersion stability.

A binder aqueous solution for power storage device of the present embodiment has favorable coatability and dispersion stability.

In the present disclosure, the ranges of numerical values of individual physical property values, contents and the like may be set as appropriate (by, for example, selecting values from the values of the upper limit and the lower limit described in each item to be described below). Specifically, regarding a numerical value a, in a case where A3, A2, A1 (A3>A2>A1) and the like are exemplified as the upper limit and the lower limit of the numerical value a, as the range of the numerical value a, A3 or less, A2 or less, less than A3, less than A2, A1 or more, A2 or more, more than A1, more than A2, A1 to A2 (A1 or more and A2 or less), A1 to A3, A2 to A3, A1 or more and less than A3, A1 or more and less than A2, A2 or more and less than A3, more than A1 and less than A3, more than A1 and less than A2, more than A2 and A3 or less, more than A1 and A3 or less, more than A1 and A2 or less, more than A2 and A3 or less and the like are exemplified.

In the present disclosure, "more than A" (A: numerical value) means a value of larger than A. "More than A" has the same meaning as "larger than A". Specifically, more than 99 mass % means a numerical value larger than 99 mass % (99.1 mass %, 100 mass % or the like).

In the present disclosure, each component, condition, numerical value and the like are not limited to a component, condition, numerical value and the like specifically exemplified in the specification. Each component, condition, numerical value and the like are not particularly limited as long as the objective that the disclosure intends to achieve is achieved.

In the present disclosure, "(meth)acrylic" means "at least one selected from the group consisting of acrylic and methacrylic." Similarly, "(meth)acrylate" means "at least one selected from the group consisting of acrylate and methacrylate." In addition, "(meth)acryloyl" means "at least one selected from the group consisting of acryloyl and methacryloyl."

As an alkyl group, a linear alkyl group, a branched alkyl group, a cycloalkyl group and the like are exemplified.

The linear alkyl group may be expressed by a general formula of $—C_nH_{2n+1}$ (n is an integer of 1 or more). As the linear alkyl group, a methyl group, an ethyl group, an n-propyl group, an n-butyl group, an n-pentyl group, an n-hexyl group, an n-heptyl group, an n-octyl group, an n-nonyl group, an n-decamethyl group and the like are exemplified.

The branched alkyl group is a group not having a cyclic structure in which at least one hydrogen atom in a linear alkyl group is substituted by an alkyl group. As the branched alkyl group, an i-propyl group, a diethyl pentyl group, a trimethyl butyl group, a trimethyl pentyl group, a trimethyl hexyl group and the like are exemplified.

As the cycloalkyl group, a monocyclic cycloalkyl group, abridged ring cycloalkyl group, a condensed ring cycloalkyl group and the like are exemplified. A group in which at least one hydrogen atom in a cycloalkyl group is substituted by an alkyl group is also regarded as the cycloalkyl group.

In the present disclosure, a monocycle means a cyclic structure that is formed of covalent bonds of carbon and has no bridge structures. In addition, a condensed ring means a cyclic structure in which two monocycles share two atoms (that is, only one edge of each ring is shared (condensed) with each other). A bridge ring means a cyclic structure in which two or more monocycles share three or more atoms.

As the monocyclic cycloalkyl groups, a cyclopentyl group, a cyclohexyl group, a cycloheptyl group, a cyclodecyl group, a 3,5,5-trimethyl cyclohexyl group, and the like are exemplified.

As the bridge cycloalkyl group, a tricyclodecyl group, an adamantyl group, a norbornyl group and the like are exemplified.

[Binder Aqueous Solution for Power Storage Device: Also Referred to as Aqueous Solution]

The present disclosure provides a binder aqueous solution for power storage device, in which the binder aqueous solution for power storage device contains a water-soluble polymer, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is less than 300,000.

<Water-Soluble Polymer>

A water-soluble polymer may be used singly or two or more water-soluble polymers may be used.

In the present disclosure, "water-soluble" means that, when 0.5 g of a compound is dissolved in 100 g of water at 25° C., the amount of an insoluble matter is less than 0.5 mass % (less than 2.5 mg).

When 0.5 g of the water-soluble polymer is dissolved in 100 g of water, as the amount of an insoluble matter of the water-soluble polymer, less than 0.5, 0.4, 0.3, 0.2 and 0.1 mass %, 0 mass % and the like are exemplified.

((Meth)Acrylamide Group-Containing Compound)

A (meth)acrylamide group-containing compound may be used singly or two or more (meth)acrylamide group-containing compounds may be used.

In one embodiment, the (meth)acrylamide group-containing compound is represented by the following structural formula.

[Chem. 1]

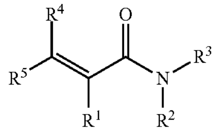

(In the formula, $R^1$ is a hydrogen atom or a methyl group. $R^2$ and $R^3$ are each independently a hydrogen atom, a substituted or unsubstituted alkyl group or an acetyl group or a group in which $R^2$ and $R^3$ form a ring structure together. $R^4$ and $R^5$ are each independently a hydrogen atom, a substituted or unsubstituted alkyl group, a hydroxy group, an amino group ($—NR^aR^b$ ($R^a$ and $R^b$ are each independently a hydrogen atom or a substituted or unsubstituted alkyl group)) or an acetyl group. As a substituent of the substituted alkyl group, a hydroxy group, an amino group, an acetyl group and the like are exemplified. In addition, as the group in which $R^2$ and $R^3$ form a ring structure together, a morpholino group and the like are exemplified.)

As the (meth)acrylamide group-containing compound, (meth)acrylamide, N-isopropyl(meth)acrylamide, N,N-dimethyl(meth)acrylamide, N,N-diethyl(meth)acrylamide, N,N-dimethylaminopropyl (meth)acrylamide, N-methylol(meth) acrylamide, diacetone (meth)acrylamide, maleic acid amide, (meth)acryloyl morpholine, hydroxyethyl (meth)acrylamide and the like are exemplified.

As the upper limit and the lower limit of the content of a structural unit derived from the (meth)acrylamide group-containing compound with respect to 100 mass % of the water-soluble polymer, less than 99.9 mass %, 99.8 mass %, 99.7 mass %, 99.6 mass %, 99.5 mass %, 99.4 mass %, 99.3 mass %, 99.2 mass %, 99.1 mass %, more than 99 mass % and the like are exemplified. In one embodiment, the content is preferably more than 99 mass % and less than 99.9 mass %.

As the upper limit and the lower limit of the content of the structural unit derived from the (meth)acrylamide group-containing compound with respect to 100 mol % of the water-soluble polymer, less than 99.97 mol %, 99.95 mol %, 99.94 mol %, 99.92 mol %, 99.90 mol %, 99.85 mol %, 99.80 mol %, 99.75 mol %, 99.70 mol %, more than 99.65 mol % and the like are exemplified. In one embodiment, the content is preferably more than 99.65 mol % and less than 99.97 mol %.

(Unsaturated Hydrocarbon Sulfonic Acid and/or Salt Thereof)

An unsaturated hydrocarbon sulfonic acid and/or a salt thereof may be used and two or more unsaturated hydrocarbon sulfonic acids and/or a salt thereof may be used.

In the present disclosure, "unsaturated hydrocarbon sulfonic acid" means a sulfonic acid in which the structure other than a sulfonic acid (salt) group is composed only of a carbon atom and a hydrogen atom.

As the unsaturated hydrocarbon sulfonic acid, vinyl sulfonic acid, styrene sulfonic acid, (meth)allylsulfonic acid and the like are exemplified.

As the salt of the unsaturated hydrocarbon sulfonic acid, an inorganic salt of the unsaturated hydrocarbon sulfonic acid and an organic salt of the unsaturated hydrocarbon sulfonic acid are exemplified.

In the present disclosure, "inorganic salt of an organic substance" means a salt in which the cationic part is a metal cation.

As the inorganic salt of the unsaturated hydrocarbon sulfonic acid, a sodium salt of the unsaturated hydrocarbon sulfonic acid, a lithium salt of the unsaturated hydrocarbon sulfonic acid, a calcium salt of the unsaturated hydrocarbon sulfonic acid and the like are exemplified.

As the organic salt of the unsaturated hydrocarbon sulfonic acid, an ammonium salt of the unsaturated hydrocarbon sulfonic acid, an amine salt of the unsaturated hydrocarbon sulfonic acid and the like are exemplified.

As the upper limit and the lower limit of the content of a structural unit derived from the unsaturated hydrocarbon sulfonic acid and/or the salt thereof with respect to 100 mass % of the water-soluble polymer, less than 1 mass %, 0.9 mass %, 0.8 mass %, 0.7 mass %, 0.6 mass %, 0.5 mass %, 0.4 mass %, 0.3 mass %, 0.2 mass %, more than 0.1 mass % and the like are exemplified. In one embodiment, the content is preferably more than 0.1 mass % and less than 1 mass %.

As the upper limit and the lower limit of the content of the structural unit derived from the unsaturated hydrocarbon sulfonic acid and/or the salt thereof with respect to 100 mol % of the water-soluble polymer, less than 0.35 mol %, 0.30 mol %, 0.25 mol %, 0.20 mol %, 0.15 mol %, 0.10 mol %, 0.08 mol %, 0.06 mol %, 0.05 mol %, more than 0.03 mol % and the like are exemplified. In one embodiment, the content is preferably more than 0.03 mol % and less than 0.35 mol %.

(Unsaturated Non-Hydrocarbon Sulfonic Acid and/or Salt Thereof)

An unsaturated non-hydrocarbon sulfonic acid and/or a salt thereof may be used and two or more unsaturated non-hydrocarbon sulfonic acids and/or a salt thereof may be used.

In the present disclosure, "unsaturated non-hydrocarbon sulfonic acid" means a sulfonic acid in which the structure other than a sulfonic acid (salt) group is composed of a carbon atom, a hydrogen atom and an atom that is neither a carbon atom nor a hydrogen atom.

In the present disclosure, a compound that corresponds to both "(meth)acrylamide group-containing compound" and "unsaturated non-hydrocarbon sulfonic acid and/or salt thereof" is regarded as "unsaturated non-hydrocarbon sulfonic acid and/or salt thereof".

As the unsaturated non-hydrocarbon sulfonic acid, (meth) acrylamido t-butylsulfonic acid, 2-(meth)acrylamido-2-methylpropanesulfonic acid, 2-(meth)acrylamido-2-hydroxypropanesulfonic acid, 3-sulfopropane (meth)acrylate ester, bis-(3-sulfopropyl) itaconic acid ester and the like are exemplified.

As the salt of the unsaturated non-hydrocarbon sulfonic acid, an inorganic salt of the unsaturated non-hydrocarbon sulfonic acid and an organic salt of the unsaturated non-hydrocarbon sulfonic acid are exemplified.

As the inorganic salt of the unsaturated non-hydrocarbon sulfonic acid, a sodium salt of the unsaturated non-hydrocarbon sulfonic acid, a lithium salt of the unsaturated non-hydrocarbon sulfonic acid, a calcium salt of the unsaturated non-hydrocarbon sulfonic acid and the like are exemplified.

As the organic salt of the unsaturated non-hydrocarbon sulfonic acid, an ammonium salt of the unsaturated non-hydrocarbon sulfonic acid, an amine salt of the unsaturated non-hydrocarbon sulfonic acid and the like are exemplified.

As the upper limit and the lower limit of the content of a structural unit derived from the unsaturated non-hydrocarbon sulfonic acid and/or the salt thereof with respect to 100 mass % of the water-soluble polymer, less than 1 mass %, 0.9 mass %, 0.8 mass %, 0.7 mass %, 0.6 mass %, 0.5 mass %, 0.4 mass %, 0.3 mass %, 0.2 mass %, 0.1 mass %, 0 mass % and the like are exemplified. In one embodiment, the content is preferably 0 mass % or more and less than 1 mass %.

As the upper limit and the lower limit of the content of the structural unit derived from the unsaturated non-hydrocarbon sulfonic acid and/or the salt thereof with respect to 100 mol % of the water-soluble polymer, less than 0.35 mol %, 0.30 mol %, 0.25 mol %, 0.20 mol %, 0.15 mol %, 0.10 mol %, 0.08 mol %, 0.06 mol %, 0.05 mol %, 0.03 mol %, 0.01 mol %, 0 mol % and the like are exemplified. In one embodiment, the content is preferably 0 mol % or more and less than 0.35 mol %.

(Monomer that is not any of the Above-Described Components: Also Referred to as the Other Component)

The water-soluble polymer may include a structural unit derived from a monomer that is not any of the (meth) acrylamide group-containing compound, the unsaturated hydrocarbon sulfonic acid and/or the salt thereof and the unsaturated non-hydrocarbon sulfonic acid and/or the salt thereof (the other component). One other component may be used singly or two or more other components may be jointly used.

As the other component, an unsaturated carboxylic acid, an unsaturated phosphoric acid, an α,β-unsaturated nitrile, a hydroxyl group-containing unsaturated carboxylic acid ester, a hydroxyl group-free unsaturated carboxylic acid ester, a conjugated diene, an aromatic vinyl compound, salts thereof and the like are exemplified.

As the content of a structural unit derived from the other component with respect to 100 mass % of the water-soluble polymer, less than 0.9 mass %, less than 0.8 mass %, less than 0.7 mass %, less than 0.6 mass %, less than 0.5 mass %, less than 0.4 mass %, less than 0.3 mass %, less than 0.2 mass %, less than 0.1 mass %, less than 0.09 mass %, less than 0.05 mass %, less than 0.02 mass %, less than 0.01 mass %, 0 mass % and the like are exemplified.

As the upper limit and the lower limit of the content of the structural unit derived from the other component with respect to 100 mol % of the water-soluble polymer, less than 0.32 mol %, less than 0.3 mol %, less than 0.25 mol %, less than 0.2 mol %, less than 0.15 mol %, less than 0.1 mol %, less than 0.09 mol %, less than 0.05 mol %, less than 0.02 mol %, less than 0.01 mol %, 0 mol % and the like are exemplified.

<Method for Producing Water-Soluble Polymer>

The water-soluble polymer may be synthesized by a variety of well-known polymerization methods, preferably, the radical polymerization method. Specifically, it is preferable that a radical polymerization initiator and, if necessary, a chain transfer agent are added to a monomer liquid mixture containing the above-described components and a polymerization reaction is performed at a reaction temperature of 50° C. to 100° C. while the components are being stirred. The reaction time is not particularly limited, but is preferably 1 to 10 hours.

As the radical polymerization initiator, persulfates such as potassium persulfate and ammonium persulfate; redox-system polymerization initiators obtained by combining the above-described persulfate and a reducing agent such as sodium hydrogen sulfite; azo-based initiators such as 2,2'-azobis-2-amidinopropane dihydrochloride and the like are exemplified. The amount of the radical polymerization initiator used with respect to 100 mass % of the monomer group that forms the water-soluble polymer is preferably 0.05 to 5.0 mass % and more preferably 0.1 to 3.0 mass %.

For the purpose of improving the production stability before a radical polymerization reaction, at the time of dissolving the obtained water-soluble polymer in water and/or the like, the pH of a reaction solution may be adjusted with an ordinary neutralizer such as ammonia, an organic amine, potassium hydroxide, sodium hydroxide or lithium hydroxide. In this case, the pH is preferably 2 to 11. In addition, for the same purpose, it is also possible to use ethylenediaminetetraacetic acid (EDTA), which is a metal ion sealant, a salt thereof and the like.

<Physical Properties and the Like of Water-Soluble Polymer>

As the upper limit and the lower limit of the weight average molecular weight of the water-soluble polymer, less than 300,000, 299,000, 270,000, 250,000, 230,000, 210,000, 200,000, 190,000, 170,000, 150,000, 130,000, 110,000, 100,000 and the like are exemplified. In one embodiment, the weight average molecular weight is preferably less than 300,000 and more preferably 100,000 or more and less than 300,000.

As the upper limit and the lower limit of the number-average molecular weight of the water-soluble polymer, less than 100,000, 95,000, 90,000, 85,000, 80,000, 75,000, 70,000, 65,000, 60,000, 55,000, 50,000, 45,000, 40,000, 35,000, 30,000, 25,000, 20,000, 15,000, 10,000 and the like are exemplified. In one embodiment, the number-average molecular weight is preferably 10,000 or more and less than 100,000.

As the upper limit and the lower limit of the molecular weight distribution (Mw/Mn) of the water-soluble polymer, 15, 14, 13, 11, 10, 9, 7.5, 5, 4, 3, 2.9, 2.5, 2, 1.5, 1.1 and the like are exemplified. In one embodiment, the molecular weight distribution (Mw/Mn) of the water-soluble polymer is preferably 1.1 to 15.

As the conditions for measuring the weight average molecular weight, the number-average molecular weight and the molecular weight distribution of the water-soluble polymer, the following conditions and the like are exemplified.

Measuring instrument: GPC (model No.: HLC-8220) manufactured by Tosoh Corporation Columns: TSKgel guardcolum $PW_{XL}$ (manufactured by Tosoh Corporation), TSK-GEL $G2500PW_{XL}$ (manufactured by Tosoh Corporation) and TSK-GEL $GMPW_{XL}$ (manufactured by Tosoh Corporation)

Eluent: 0.1 M $NaNO_3$ aqueous solution

Calibration curve: Standard polyethylene oxide

Measuring method: The water-soluble polymer is dissolved in the eluent such that the concentration reaches 0.3 mass % and filtered, and then the physical properties are measured.

As the upper limit and lower limit of the B-type viscosity of an aqueous solution composed of the water-soluble polymer and water (water-soluble polymer/water=15/85 mass %), 10,000, 9,500, 9,000, 8,500, 8,000, 7,500, 7,000, 6,500, 6,000, 5,500, 5,000, 4,500, 4,000, 3,500, 3,000, 2,500, 2,000, 1,500, 1000, 500 mPa-s and the like are exemplified. In one embodiment, the B-type viscosity is preferably 500 to 10,000 mPa-s and more preferably 500 mPa-s or more and less than 10,000 mPa-s.

As the conditions for measuring the B-type viscosity, the following conditions and the like are exemplified.

Solid content concentration: 15 mass %

Measuring temperature: 25° C.

B-type viscometer: Product name "B-type viscometer model BM" manufactured by Toki Sangyo Co., Ltd.

In the case of viscosity being 100 to 10,000 mPa-s: The No. 3 rotor is used, and the rotation speed is 12 rpm.

In the case of viscosity being more than 10,000 to 20,000 mPa-s or less: The No. 3 rotor is used, and the rotation speed is 6 rpm.

As the upper limit and the lower limit of the content of the water-soluble polymer with respect to 100 mass % of the binder aqueous solution for power storage device, 20, 19, 15, 14, 12, 10, 9, 7, 6, 5, 4, 3, 2, 1 mass % and the like are exemplified. In one embodiment, the content is preferably 1 to 20 mass %.

<Water>

As the water, ultrapure water, pure water, distilled water, ion exchange water, tap water and the like are exemplified.

As the upper limit and the lower limit of the content of the water with respect to 100 mass % of the binder aqueous solution for power storage device, 99.9, 99, 95, 90, 85, 80 mass % and the like are exemplified. In one embodiment, the content is preferably 80 to 99.9 mass %.

As the upper limit and the lower limit of the mass ratio of the water-soluble polymer to the water [water-soluble polymer/water], 0.25, 0.24, 0.22, 0.20, 0.18, 0.15, 0.12, 0.10, 0.09, 0.07, 0.05, 0.04, 0.02, 0.01, 0.009, 0.005, 0.004, 0.002, 0.001 and the like are exemplified. In one embodiment, the mass ratio is preferably 0.001 to 0.25.

<Dispersion Element (Emulsion)>

In one embodiment, the binder aqueous solution for power storage device contains a dispersion element (emulsion). One dispersion element (emulsion) may be used singly or two or more dispersion elements (emulsions) may be jointly used.

As the dispersion element (emulsion), styrene-butadiene-based copolymer latex, polystyrene-based polymer latex, polybutadiene-based polymer latex, acrylonitrile-butadiene-based copolymer latex, polyurethane-based polymer latex, polymethyl methacrylate-based polymer latex, methyl methacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), aromatic polyamide, alginic acid, salts thereof, polyvinylidene fluoride (PVDF), polytetrafluoroethylene (PTFE), tetrafluoro ethylene-hexafluoropropylene copolymer (FEP), tetrafluoroethylene-perfluoroalkyl vinyl ether copolymer (PFA), ethylene-tetrafluoroethylene copolymer (ETFE) and the like are exemplified.

As the upper limit and the lower limit of the content of the dispersion element (emulsion) with respect to 100 mass % of the water-soluble polymer, 100, 95, 90, 85, 80, 75, 70, 65, 60, 55, 50, 45, 40, 35, 30, 25, 20, 19, 17, 15, 13, 10, 9, 7, 5, 4, 2, 1, 0 mass % and the like are exemplified.

In one embodiment, from the viewpoint of electrode flexibility and the discharge capacity retention rate, the content is preferably 0 to 100 mass %.

<Viscosity Improver>

In one embodiment, the binder aqueous solution for power storage device contains a viscosity improver. One viscosity improver may be used singly or two or more viscosity improvers may be jointly used.

As the viscosity improver, cellulosic polymers such as carboxymethyl cellulose, methyl cellulose and hydroxypropyl cellulose, ammonium salts and alkali metal salts thereof; (modified) poly(meth)acrylic acids and ammonium salts and alkali metal salts thereof; polyvinyl alcohols such as (modified) polyvinyl alcohol, copolymers of acrylic acid or acrylate and vinyl alcohol and copolymers of maleic anhydride, maleic acid or fumaric acid and vinyl alcohol; polyethylene glycol, polyethylene oxide, polyvinylpyrrolidone, modified polyacrylic acid, oxidized starch, starch phosphate, casein, a variety of modified starches, acrylonitrile-butadiene copolymer hydrides and the like are exemplified.

As the upper limit and the lower limit of the content of the viscosity improver with respect to 100 mass % of the water-soluble polymer, 50, 45, 40, 35, 30, 25, 20, 19, 17, 15, 13, 10, 9, 7, 5, 4, 2, 1, 0.5, 0 mass % and the like are exemplified. In one embodiment, the content is preferably 0 to 50 mass %.

<Additive>

The binder aqueous solution for power storage device may contain a component that is not any of the water-soluble polymer, the water, the dispersion element (emulsion) and the viscosity improver as an additive. One additive may be used singly or two or more additives may be jointly used.

As the additive, a dispersant, a leveling agent, an antioxidant and the like are exemplified.

As the dispersant, an anionic dispersant, a cationic dispersant, a non-ionic dispersant, a polymer dispersant and the like are exemplified.

As the leveling agent, surfactants such as an alkyl-based surfactant, a silicon-based surfactant, a fluorine-based surfactant and a metal-based surfactant and the like are exemplified.

The use of the surfactant makes it possible to prevent the occurrence of cissing during coating and to improve the smoothness of a layer of the above-described slurry (coating layer).

As the antioxidant, a phenol compound, a hydroquinone compound, an organic phosphorus compound, a sulfur compound, a phenylene diamine compound, a polymer-type phenol compound and the like are exemplified. The polymer-type phenol compound is a polymer having a phenol structure in the molecule. The weight average molecular weight of the polymer-type phenol compound is preferably 200 to 1,000 and more preferably 600 to 700.

As the content of the additive with respect to 100 mass % of the water-soluble polymer, less than 5 mass %, less than 4 mass %, less than 2 mass %, less than 1 mass %, less than 0.9 mass %, less than 0.5 mass %, less than 0.4 mass %, less than 0.2 mass %, less than 0.1 mass %, less than 0.09 mass %, less than 0.05 mass %, less than 0.04 mass %, less than 0.02 mass %, less than 0.01 mass %, 0 mass % and the like are exemplified.

In addition, as the content of the additive with respect to 100 mass % of the above-described aqueous solution, less than 5 mass %, less than 4 mass %, less than 2 mass %, less than 1 mass %, less than 0.9 mass %, less than 0.5 mass %, less than 0.4 mass %, less than 0.2 mass %, less than 0.1 mass %, less than 0.09 mass %, less than 0.05 mass %, less than 0.04 mass %, less than 0.02 mass %, less than 0.01 mass %, 0 mass % and the like are exemplified.

As the upper limit and the lower limit of the pH of the binder aqueous solution for power storage device, 9, 8.9, 8.5, 8, 7.9, 7.5, 7, 6.9, 6.5, 6, 5.9, 5.6, 5.5, 5.4, 5.2, 5.1, 5 and the like are exemplified. In one embodiment, the pH of the binder aqueous solution for power storage device is preferably 5 to 9 from the viewpoint of the solution stability.

The pH may be measured at 25° C. using a glass electrode pH meter (for example, product name "pH meter D-52" manufactured by Horiba Ltd.)

The binder aqueous solution for power storage device may be used as an electrode for power storage device binder aqueous solution, a power storage device negative electrode binder aqueous solution, a separator for power storage device binder aqueous solution, a power storage device conductive carbon auxiliary agent dispersant, a battery electrode binder aqueous solution, a battery negative electrode binder aqueous solution, a battery separator binder aqueous solution, a battery conductive carbon auxiliary agent dispersant, a non-aqueous secondary battery electrode binder aqueous solution, a non-aqueous secondary battery negative electrode binder aqueous solution, a non-aqueous secondary battery separator binder aqueous solution, a non-aqueous secondary battery conductive carbon auxiliary agent dispersant, a lithium ion battery electrode binder aqueous solution, a lithium ion battery negative electrode binder aqueous solution, a lithium ion battery separator binder aqueous solution, a lithium ion battery conductive carbon auxiliary agent dispersant, a sodium ion battery electrode binder aqueous solution, a sodium ion battery negative electrode binder aqueous solution, a sodium ion battery separator binder aqueous solution, a sodium ion battery conductivity carbon auxiliary agent dispersant and the like.

[Slurry for Power Storage Device: Also Referred to as Slurry]

The present disclosure is a slurry for power storage device, in which the slurry for power storage device contains a water-soluble polymer, water and an electrode active material or a non-conductive particle, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is less than 300,000.

In the present disclosure, "slurry" means a suspension of a liquid and solid particles.

As the water-soluble polymer, the water, the dispersion element (emulsion) and the viscosity improver, the above-described substances and the like are exemplified.

As the upper limit and the lower limit of the content of the water-soluble polymer with respect to 100 mass % of the slurry, 10, 9, 8, 7, 6, 5, 4, 3, 2, 1, 0.9, 0.7, 0.5, 0.3, 0.1 mass % and the like are exemplified. In one embodiment, the content with respect to 100 mass % of the slurry is preferably 0.1 to 10 mass %.

As the upper limit and the lower limit of the content of the water with respect to 100 mass % of the slurry, 80, 75, 70, 65, 60, 55, 50, 45, 40, 35, 30 mass % and the like are exemplified.

In one embodiment, the content is preferably 30 to 80 mass %.

As the contents of the dispersion element (emulsion) and the viscosity improver with respect to 100 mass % of the water-soluble polymer, the above-described values and the like are exemplified.

<Electrode Active Material>

One electrode active material may be used singly or two or more electrode active materials may be jointly used. As the electrode active material, a negative electrode active material and a positive electrode active material are exemplified.

(Negative Electrode Active Material)

As the negative electrode active material, an appropriate material may be selected as appropriate depending on the type of a target power storage device. One negative electrode active material may be used singly or two or more negative electrode active materials may be jointly used. As the negative electrode active material, carbon materials, silicon materials, oxides containing a lithium atom, materials that form an alloy with lithium such as a lead compound, a tin compound, an arsenic compound, an antimony compound and an aluminum compound and the like are exemplified.

As the carbon materials, graphite, which is highly crystalline carbon, (also referred to as graphite, natural graphite, artificial graphite and the like are exemplified), poorly crystalline carbon (soft carbon and hard carbon), carbon black (ketjen black, acetylene black, channel black, lamp black, oil furnace black, thermal black and the like), fullerene, carbon nanotubes, carbon nanofibers, carbon nanohorns, carbon fibrils, mesocarbon microbeads (MCMB), pitch-based carbon fibers and the like are exemplified.

As the silicon materials, in addition to silicon, silicon oxides and silicon alloys, silicon oxide complexes represented by SiC, $SiO_xC_y$ ($0<x\leq3$, $0<y\leq5$), $Si_3N_4$, $Si_2N_2O$ and $SiO_x$ ($0<x\leq2$) (for example, materials described in Japanese Patent Laid-Open No. 2004-185810 or Japanese Patent Laid-Open No. 2005-259697 and the like), a silicon material described in Japanese Patent Laid-Open No. 2004-185810 and the like are exemplified. In addition, silicon materials described in Japanese Patent No. 5390336 and Japanese Patent No. 5903761 may also be used.

The silicon oxides are preferably silicon oxides represented by a composition formula $SiO_x$ ($0<x<2$, preferably $0.1\leq x\leq1$).

The silicon alloys are preferably alloys of silicon and at least one transition metal selected from the group consisting of titanium, zirconium, nickel, copper, iron and molybdenum. The silicon alloys with this transition metal are preferable due to a high electron conductivity and a high strength. The silicon alloys are more preferably a silicon-nickel alloy or a silicon-titanium alloy and particularly preferably a silicon-titanium alloy. The content proportion of silicon in the silicon alloy is preferably 10 mol % or more and more preferably 20 to 70 mol % with respect to 100 mol % of the metal element in the silicon alloy. The silicon materials may be any of monocrystalline, polycrystalline and amorphous.

In addition, in a case where the silicon material is used as the electrode active material, an electrode active material that is not a silicon material may also be jointly used. As such an electrode active material, the above-described carbon materials; conductive polymers such as polyacene; complex metal oxides represented by $A_XB_YO_Z$ (A is an alkali metal or a transition metal, B is at least one selected from transition metals such as cobalt, nickel, aluminum, tin and manganese, 0 represents an oxygen atom, and X, Y and Z are each a number in ranges of $0.05<X<1.10$, $0.85<Y<4.00$, $1.5<Z<5.00$), other metal oxides and the like are exemplified. In a case where the silicon material is used as the electrode active material, it is preferable to jointly use a carbon material since a volume change attributed to the absorption and desorption of lithium is small.

From the viewpoint of significantly developing the effect of the disclosure, the content of the carbon material and/or the material that forms an alloy with lithium in the electrode active material is preferably 50 mass % or more, more preferably 80 mass % or more, still more preferably 90 mass % or more and particularly preferably 100 mass %.

In one embodiment, the content of silicon and/or a silicon oxide coated with a carbon layer in the electrode active material is 1 mass % or more (2, 5, 10, 25, 50, 75, 90 mass % or more, 100 mass %).

In one embodiment, as the upper limit and the lower limit of the content of the silicon material with respect to 100 mass % of the electrode active material, 100, 95, 90, 85, 80, 75, 70, 65, 60, 55, 50, 45, 40, 35, 30, 25, 20, 15, 10, 5, 0 mass % and the like are exemplified.

As the oxides containing a lithium atom, ternary lithium nickel cobalt manganese oxides, lithium manganese complex oxides ($LiMn_2O_4$ and the like), lithium nickel complex oxides ($LiNiO_2$ and the like), lithium cobalt complex oxides ($LiCoO_2$ and the like), lithium iron complex oxides ($LiFeO_2$ and the like), lithium nickel manganese complex oxides ($LiNi_{0.5}Mn_{0.5}O_2$ and the like), lithium nickel cobalt complex oxides ($LiNi_{0.8}Co_{0.2}O_2$ and the like), lithium transition metal phosphate compounds ($LiFePO_4$ and the like), and lithium-transition metal complex oxides such as lithium transition metal sulfate compounds ($Li_xFe_2(SO_4)_3$), lithium titanium complex oxides (lithium titanate: $Li_4Ti_5O_{12}$), other conventionally well-known electrode active materials and the like are exemplified.

(Positive Electrode Active Material)

Positive electrode active materials are roughly classified into active materials containing an inorganic compound and active materials containing an organic compound. As the inorganic compound that is contained in the positive electrode active material, metal oxides are exemplified. As the metal oxides, transition metal oxides, complex oxides of lithium and a transition metal, transition metal sulfides and the like are exemplified. As the transition metal, Fe, Co, Ni, Mn, A1 and the like are exemplified. As the inorganic compound that is used in the positive electrode active material, lithium-containing complex metal oxides such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $LiCo_{0.3}Ni_{0.5}Mn_{0.2}O_2$, $LiCo_{0.2}Ni_{0.6}Mn_{0.2}O_2$, $LiCo_{0.1}Ni_{0.8}Mn_{0.1}O_2$, $LiCo_{0.5}Ni_{0.8}Al_{0.05}O_2$, $Li[Li_{0.1}Al_{0.1}Mn_{1.8}]O_4$ and $LiFeVO_4$; transition metal sulfides such as $TiS_2$, $TiS_3$ and amorphous $MoS_2$; transition metal oxides such as $Cu_2V_2O_3$, amorphous $V_2O—P_2O_5$, $MoO_3$, $V_2O_5$ and $V_6O_{13}$ and the like are exemplified. In these compounds, some of the elements may be substituted. As the organic compound that is contained in the positive electrode active material, conductive polymers such as polyacetylene and poly-p-phenylene and the like are exemplified. Iron-based oxides having a poor electric conduction property may also be used as an electrode active material coated with a carbon material by providing a carbon source material during reduction firing. In addition, in these compounds, some of the elements may be substituted. Among these, from the viewpoint of practicality, electrical properties and long service lives, $LiCoO_2$, $LiNiO_2$, $LiMnO_2$, $LiMn_2O_4$, $LiFePO_4$, $LiN_{1/2}Mn_{3/2}O_4$, $LiCo_{1/3}Ni_{1/3}Mn_{1/3}O_2$, $LiCo_{0.3}Ni_{0.5}Mn_{0.2}O_2$, $LiCo_{0.2}Ni_{0.6}Mn_{0.2}O_2$, $LiCo_{0.1}Ni_{0.8}Mn_{0.1}O_2$, $LiCo_{0.15}Ni_{0.8}Al_{0.05}O_2$ and $Li[Li_{0.1}Al_{0.1}Mn_{1.8}]O_4$ are preferable.

In one embodiment, the positive electrode active material contains iron phosphate and/or a metal oxide.

The shape of the electrode active material may be an arbitrary shape such as a fine particle shape or a thin film shape, but is preferably a fine particle shape.

As the upper limit and the lower limit of the average particle diameter of the electrode active material, 50, 45, 40, 35, 30, 25, 20, 15, 10, 5, 4, 3, 2.9, 2, 1, 0.5, 0.1 μm and the like are exemplified. In one embodiment, from the viewpoint of forming a uniform and thin coating, the average particle diameter of the electrode active material is preferably 0.1 to 50 μm, more preferably 0.1 to 45 μm, still more preferably 1 to 10 μm and particularly preferably 5 μm.

In the present disclosure, "particle diameter" means the maximum distance among distances between two arbitrary points on the contour of a particle (which will be true below). In addition, in the present disclosure, unless particularly otherwise described, as "average particle diameter", a value that is calculated as the average value of the particle diameters of particles that are observed in several to several tens of visual fields using observation means such as a scanning electron microscope (SEM) or a transmission electron microscope (TEM) is employed (which will be true below).

As the upper limit and the lower limit of the content of the water-soluble polymer with respect to 100 mass % of the electrode active material in the slurry, 15, 14, 13, 12, 11, 10, 9, 8, 7, 6, 5, 4, 3, 2, 1.5, 1, 0.5 mass % and the like are exemplified. In one embodiment, the content is preferably 0.5 to 15 mass %.

(Conductive Auxiliary Agent)

In one embodiment, the slurry contains a conductive auxiliary agent. One conductive auxiliary agent may be used singly or two or more conductive auxiliary agents may be jointly used.

As the conductive auxiliary agent, fibrous carbon such as vapor-grown carbon fiber (VGCF), carbon nanotube (CNT) and carbon nanofiber (CNF), carbon black such as graphite particles, acetylene black, ketjen black and furnace black, fine powders that have an average particle diameter of 10 μm or less and are composed of Cu, Ni, Al, Si or an alloy thereof and the like are exemplified.

The content of the conductive auxiliary agent is preferably 0 to 10 mass % and more preferably 0.5 to 6 mass % with respect to the electrode active material.

<Non-Conductive Particles>

In one embodiment, the slurry for power storage device contains non-conductive particles. One type of non-conductive particles may be used singly or two or more types of non-conductive particles may be jointly used.

As the non-conductive particles, oxide particles, nitride particles, covalent crystal particles, poorly-soluble ion crystal particles, fine clay particles and the like are exemplified.

As the oxide particles, aluminum oxide (alumina), hydrates of aluminum oxide (boehmite (AlOOH), gibbsite ($Al(OH)_3$), bakelite), iron oxide, silicon oxide, magnesium oxide (magnesia), magnesium hydroxide, calcium oxide, titanium oxide (titania), $BaTiO_3$, ZrO, alumina-silica complex oxides and the like are exemplified.

As the nitride particles, aluminum nitride, silicon nitride, boron nitride and the like are exemplified.

As the covalent crystal particles, silicon, diamond and the like are exemplified.

As the poorly-soluble ion crystal particles, barium sulfate, calcium fluoride, barium fluoride and the like are exemplified.

As the fine clay particles, fine clay particles of silica, tale, montmorillonite and the like and the like are exemplified.

Among these, from the viewpoint of poor water absorbency and excellent heat resistance, boehmite, alumina, magnesium oxide and barium sulfate are preferable, and boehmite is more preferable.

As the upper limit and the lower limit of the average particle diameter of the non-conductive particles, 30, 25, 20, 15, 10, 5, 1, 0.5, 0.1, 0.05, 0.01 μm and the like are exemplified. In one embodiment, the average particle diameter is preferably 0.01 to 30 μm.

As the upper limit and the lower limit of the content of the non-conductive particles with respect to 100 mass % of the slurry, 99.9, 95, 90, 80, 70, 60, 50, 40, 30, 20, 10, 5, 1, 0.5, 0.2, 0.1 mass % and the like are exemplified. In one embodiment, the content is preferably 0.1 to 99.9 mass %.

As the upper limit and the lower limit of the content of the water-soluble polymer with respect to 100 mass % of the non-conductive particles, 15, 14, 13, 12, 11, 10, 9, 8, 7, 6, 5, 4, 3, 2, 1.5, 1 mass % and the like are exemplified. In one embodiment, the content is preferably 1 to 15 mass %, more preferably 1.5 to 14 mass % and still more preferably 2 to 12 mass %.

<Slurry Viscosity-Adjusting Solvent>

One slurry viscosity-adjusting solvent may be used singly or two or more slurry viscosity-adjusting solvents may be jointly used.

As the slurry viscosity-adjusting solvent, amide solvents such as N-methylpyrrolidone, dimethylformamide and N,N-dimethylacetamide; hydrocarbon solvents such as toluene, xylene, n-dodecane, tetralin; alcohol solvents such as methanol, ethanol, 2-propanol, isopropyl alcohol, 2-ethyl-1-hexanol, 1-nonanol and lauryl alcohol; ketone solvents such as acetone, methyl ethyl ketone, cyclohexanone, phorone, acetophenone and isophorone; ether solvents such as dioxane and tetrahydrofuran (THF); ester solvents such as benzyl acetate, isopentyl butyrate, methyl lactate, ethyl lactate and butyl lactate; amine solvents such as o-toluidine, m-toluidine and p-toluidine; lactones such as γ-butyrolactone and 8-butyrolactone; sulfoxide/sulfone solvents such as dimethylsulfoxide and sulfolane; water; and the like are exemplified. Among these, from the viewpoint of coating workability, N-methylpyrrolidone is preferable.

As the upper limit and the lower limit of the content of the slurry viscosity-adjusting solvent with respect to 100 mass % of slurry, 10, 9, 8, 7, 6, 5, 4, 3, 2, 1, 0.5, 0.1, 0 mass % and the like are exemplified. The content is preferably 0 to 10 mass %.

<Additive>

The slurry may contain a component that is not any of the water-soluble polymer, the water, the dispersion element (emulsion), the viscosity improver, the electrode active material, the conductive auxiliary agent, the non-conductive particles and the slurry viscosity-adjusting solvent as an additive. As the additive, the above-described additives are exemplified.

As the content of the additive with respect to 100 mass % of the water-soluble polymer, 0 to 5 mass %, less than 1 mass %, less than 0.1 mass %, less than 0.01 mass %, 0 mass % and the like are exemplified.

As the content of the additive with respect to 100 mass % of the electrode active material, 0 to 5 mass %, less than 1 mass %, less than 0.1 mass %, less than 0.01 mass %, 0 mass % and the like are exemplified.

As the content of the additive with respect to 100 mass % of the non-conductive particles, 0 to 5 mass %, less than 1 mass %, less than 0.1 mass %, less than 0.01 mass %, 0 mass % and the like are exemplified.

The dispersion element (emulsion) may be contained more than the contents of the above-described additives. As the upper limit and the lower limit of the content of the dispersion element (emulsion) with respect to 100 mass % of the slurry for power storage device, 20, 19, 17, 15, 13, 10, 9, 7, 5, 4, 2, 1, 0 mass % and the like are exemplified. In one embodiment, the content is preferably less than 5 mass %.

The slurry is produced by mixing the water-soluble polymer, the water, the electrode active material or the non-conductive particles, if necessary, the conductive auxiliary agent and the slurry viscosity-adjusting solvent.

As means for mixing the slurry, a ball mill, a sand mill, a pigment disperser, a grinder, an ultrasonic disperser, a homogenizer, a planetary mixer, a Hobart mixer and the like are exemplified.

The slurry for power storage device may be used as an electrode for power storage device slurry, a power storage device negative electrode slurry, a power storage device positive electrode slurry, a separator for power storage device slurry, a battery electrode slurry, a battery negative electrode slurry, a battery positive electrode slurry, a battery separator slurry, a non-aqueous secondary battery electrode slurry, a non-aqueous secondary battery negative electrode slurry, a non-aqueous secondary battery positive electrode slurry, a non-aqueous secondary battery separator slurry, a lithium ion battery electrode slurry, a lithium ion battery negative electrode slurry, a lithium ion battery positive electrode slurry, a lithium ion battery separator slurry, a sodium ion battery electrode slurry, a sodium ion battery negative electrode slurry, a sodium ion battery positive electrode slurry, a sodium ion battery separator slurry and the like.

[Electrode for Power Storage Device: Also Referred to as Electrode]

The present disclosure provides an electrode for power storage device having a dried substance of the slurry for power storage device on a current collector. The electrode for power storage device may be obtained by applying and drying the slurry for power storage device on a current collector.

As the current collector, metal materials such as copper, iron, aluminum, nickel, stainless steel and nickel-plated steel and carbon materials such as carbon cloth and carbon paper are exemplified. As the form of the current collector, a metal foil, a metal cylinder, a metal coil, a metal plate and the like are exemplified in the case of the metal materials, and a carbon plate, a carbon thin film, a carbon cylinder and the like are exemplified in the case of the carbon materials. Among them, in a case where the electrode active material is used in a negative electrode, a copper foil is preferable as the current collector since the copper foil is being used in currently-industrialized products.

Coating means is not particularly limited, and well-known conventional coating devices such as a comma coater, a gravure coater, a micro gravure coater, a die coater and a bar coater are exemplified.

Drying means is also not particularly limited, and the temperature is preferably 60° C. to 200° C. and more preferably 100° C. to 195° C. The atmosphere needs to be a dried air or an inert atmosphere.

The thickness of the electrode (cured substance) is preferably 5 to 300 μm and more preferably 10 to 250 μm.

The electrode for power storage device may be used as a power storage device positive electrode, a power storage device negative electrode, a battery electrode, a battery positive electrode, a battery negative electrode, a non-aqueous secondary battery electrode, a non-aqueous secondary battery positive electrode, a non-aqueous secondary battery negative electrode, a lithium ion battery electrode, a lithium ion battery positive electrode, a lithium ion battery negative electrode, a sodium ion battery electrode, a sodium ion battery positive electrode, a sodium ion battery negative electrode and the like.

[Separator for Power Storage Device: Also Referred to as Separator]

The present disclosure provides a separator for power storage device having a dried substance of the slurry for power storage device on a base material. The separator for power storage device may be obtained by applying and drying the slurry for power storage device on a base material.

The slurry for power storage device may be applied to only one surface of the base material or may be applied to both surfaces.

As the base material, a porous polyolefin resin base material, a plastic non-woven fabric and the like are exemplified.

(Porous Polyolefin Resin Base Material)

The porous polyolefin resin base material is a fine porous film containing 50 mass % or more of a resin of a polyolefin, a mixture thereof, a copolymer thereof or the like. The porous polyolefin resin base material is preferable from the viewpoint of excellent coatability of a coating fluid in the case of obtaining a polymer layer by a coating step and an increase in the capacity per volume by further decreasing the film thickness of the separator and increasing the active material rate in power storage devices.

In one embodiment, from the viewpoint of shutdown performance in the case of being used as the separator for power storage device, the content of a polyolefin resin in the porous polyolefin resin base material is preferably 50 mass % or more and 100 mass % or less, more preferably 60 mass % or more and 100 mass % or less and still more preferably 70 mass % or more and 100 mass % or less of all components that configure the base material.

The polyolefin resin needs to be a polyolefin resin that is used in extrusion, injection, inflation, blow molding and the like. One polyolefin resin may be used singly or two or more polyolefin resins may be jointly used. As the polyolefin resin, homopolymers, copolymers, multistage polymers and the like of ethylene, propylene, 1-butene, 4-methyl-1-pentene, 1-hexene, 1-octene or the like are exemplified. As a polymerization catalyst that is used at the time of producing these polyolefin resins, a Ziegler-Natta catalyst, a Phillips catalyst, a metallocene catalyst and the like are exemplified.

The polyolefin resin that is used as the material of the porous polyolefin resin base material is preferably a resin containing, in particular, high-density polyethylene as a main component since the melting point is low and the strength is high. Furthermore, from the viewpoint of improving the heat resistance of a polyolefin porous base material, it is more preferable to jointly use a porous polyolefin resin base material containing polypropylene and a polyolefin resin other than polypropylene.

Here, the steric structure of the polypropylene is not particularly limited and may be any of isotactic polypropylene, syndiotactic polypropylene and atactic polypropylene.

The proportion of the polypropylene in the total amount of the polyolefin that is contained in a polyolefin resin composition is not particularly limited, but is preferably 1 to 35 mass %, more preferably 3 to 20 mass % and still more preferably 4 to 10 mass % from the viewpoint of satisfying both heat resistance and a favorable shutdown function.

From the viewpoint of shutdown characteristics by which holes in the polyolefin porous base material are blocked by thermal fusion, as the polyolefin resin other than the polypropylene, polyethylene such as low-density polyethylene, linear low-density polyethylene, medium-density polyethylene, high-density polyethylene or ultrahigh-molecular-weight polyethylene is preferably used. Among these, from the viewpoint of the strength, polyethylene having a density of 0.93 g/cm$^3$ or higher, which is measured according to JIS K 7112, is more preferable.

The porous polyolefin resin base material may contain a filler or a fiber compound for the purpose of controlling the strength or hardness and the thermal shrinkage. In addition, for the purpose of improving the adhesion to an adhesive layer or improving the impregnability of liquid by decreasing the surface tension with an electrolytic solution, the surface of the porous polyolefin resin base material may be coated with a low-molecular-weight compound or a high-molecular-weight compound in advance or an electromagnetic ray treatment with ultraviolet rays or a plasma treatment with corona discharge or a plasma gas may be performed. Particularly, the surface of the porous polyolefin resin base material is preferably coated with a high-molecular-weight compound having a polar group such as a carboxylic acid group, a hydroxyl group or a sulfonic acid group since the impregnability of an electrolytic solution is favorable, and it is easy to obtain adhesion to a coating layer that is obtained by applying and drying the slurry on the base material.

The thickness of the porous polyolefin resin base material is not particularly limited, but is preferably 2 μm or more, more preferably 5 μm or more and preferably 100 μm or less, more preferably 60 μm or less and still more preferably 50 μm or less. This thickness is preferably adjusted to 2 μm or more from the viewpoint of improving the mechanical strength. Incidentally, this film thickness is preferably adjusted to 100 μm or less since the occupied volume of the separator in a battery decreases, which tends to be advantageous in increasing the capacity of the battery.

(Plastic Non-Woven Fabric)

In one embodiment, the average fiber diameter of the plastic non-woven fabric that is used in the separator for power storage device is preferably 1 to 15 μm and more preferably 1 to 10 μm from the viewpoint of adhesion to non-woven fabric and the thickness of the separator.

In one embodiment, the average pore diameter of the plastic non-woven fabric is preferably 1 to 20 μm, more preferably 3 to 20 μm and still more preferably 5 to 20 μm.

In the present disclosure, the pore diameter means the gap between synthetic fibers that form the plastic non-woven fabric. In addition, the average fiber diameter means the average value of the fiber diameters of 20 fibers randomly selected after the fiber diameters of fibers are measured from a scanning electron micrograph. Similarly, the average pore diameter means the average value of the pore diameters of 20 fibers randomly selected after the pore diameters of fibers are measured from a scanning electron micrograph.

The non-woven fabric is preferably composed of only synthetic fibers in which the average fiber diameter of the configuration fibers is 1 to 10 μm and the average pore diameter is 1 to 20 μm. In a case where a need for decreasing the thickness of the separator is not so strong, synthetic fibers having average fiber diameter and pore diameter that are different from the above-described diameters may be jointly used as necessary. In addition, from the same viewpoint, fibers other than synthetic fibers may be jointly used as appropriate. In a case where these fibers (synthetic resin fibers having an average fiber diameter and an average pore diameter that are outside the ranges specified in the present application or fibers other than synthetic fibers) are jointly used, the content thereof is preferably 30 mass % or less, more preferably 20 mass % or less and still more preferably 10 mass % or less from the viewpoint of ensuring the strength of the non-woven fabric.

As the synthetic resin that serves as the material of the synthetic resin fibers, a polyolefin-based resin, a polyester-based resin, a polyvinyl acetate-based resin, an ethylene-vinyl acetate copolymer resin, a polyamide-based resin, an acrylic resin, a polyvinyl chloride-based resin, a polyvinylidene chloride-based resin, a polyvinyl ether-based resin, a polyvinyl ketone-based resin, a polyether-based resin, a polyvinyl alcohol-based resin, a diene-based resin, a polyurethane-based resin, a phenolic resin, a melamine-based resin, a furan-based resin, an urea-based resin, an aniline-based resin, an unsaturated polyester-based resin, an alkyd resin, a fluororesin, a silicone-based resin, a polyamide-imide-based resin, a polyphenylene sulfide-based resin, a polyimide-based resin, a polycarbonate-based resin, a polyazomethine-based resin, a polyesteramide resin, a polyether ether ketone-based resin, a poly-p-phenylenebenzobisoxazole resin, a polybenzimidazole-based resin, an ethylene-vinyl alcohol copolymer-based resin and the like are exemplified. Among these, a polyester-based resin, an acrylonitrile-based resin and a polyolefin-based resin are preferable in order to enhance adhesion to the non-conductive particles. In addition, the use of a polyester-base resin, an acrylic resin or a polyamide-based resin makes it possible to improve the heat resistance of the separator.

As the polyester-based resin, polyethylene terephthalate (PET)-based resins, polybutylene terephthalate (PBT)-based resins, polytrimethylene terephthalate (PPT)-based resins, polyethylene naphthalate (PEN)-based resins, polybutylene naphthalate-based resins, polyethylene isonaphthalate-based resins, wholly aromatic polyester-based resins and other resins are exemplified. In addition, derivatives of these resins can also be used. Among these resins, the polyethylene terephthalate-based resins are preferable in order to improve heat resistance, electrolytic solution resistance and adhesion to the non-conductive particles.

As the acrylonitrile-based resin, resins composed of a polymer of acrylonitrile (100%), copolymers of acrylonitrile and a (meth)acrylic acid derivative of as acrylic acid, methacrylic acid, an acrylic acid ester, a methacrylic acid ester or the like, vinyl acetate or the like and the like are exemplified.

As the polyolefin-based resin, polypropylene, polyethylene, polymethylpentene, ethylene-vinyl alcohol copolymers, olefin-based copolymers and the like are exemplified. From the viewpoint of heat resistance, the polyolefin-based resin is preferably polypropylene, polymethylenepentene, an ethylene-vinyl alcohol copolymer, a olefin-based copolymer or the like.

As the polyamide-based resin, aliphatic polyamides such as nylon, wholly aromatic polyamides such as poly-p-phenylene terephthalamide, poly-p-phenylene terephthalamide-3,4-diphenyl ether terephthalamide and poly-m-phenylene isophthalamide, semi-aromatic polyamides having a fatty chain in a part of the main chain in an aromatic polyamide and the like are exemplified. The wholly aromatic polyamide may be any of a para-type wholly aromatic polyamide or a meth-type wholly aromatic polyamide.

The synthetic resin fiber may be a fiber composed of one type of resin (single fiber) or may be a fiber composed of two or more types of resins (composite fiber). As the composite fiber, a core-sheath type fiber, an eccentric type fiber, a side-by-side type fiber, a sea-island type fiber, an orange type fiber and a multi-bimetal type fiber are exemplified.

In addition, as the fiber other than the synthetic resin fiber that may be jointly used with the synthetic resin fiber, short fibers and fibrillated substances of solvent-spun cellulose and regenerated cellulose, natural cellulose fibers, pulped substances and fibrillated substances of natural cellulose fibers, inorganic fibers and the like are exemplified.

The thickness of the plastic non-woven fabric is preferably 5 to 25 μm and more preferably 5 to 15 μm from the viewpoint of decreasing the thickness and obtaining a separator having small internal resistance.

<Method for Producing Separator for Power Storage Device>

As a method for producing the separator for power storage device, a method including a coating step of applying the slurry for power storage device to the base material and a drying step of drying the applied slurry for power storage device and the like are exemplified.

(Coating Step)

A method for applying the slurry for power storage device to the base material is not particularly limited, and a variety of coating methods in which a blade, a rod, a reverse roll, a lip, a die, a curtain, or an air knife is used, a variety of printing methods such as flexographic printing, screen printing, offset printing, gravure printing, and inkjet printing, transfer methods such as roll transfer and film transfer, methods in which the coating liquid on a non-coated surface side is scraped off after a lifting method of dipping or the like, and the like are exemplified.

(Drying Step)

As a drying method, drying by a warm air, a hot air, a low humidity air or the like; vacuum drying; drying methods by irradiation with infrared rays, far infrared rays, electron beams, or the like and the like are exemplified.

The lower limit of the temperature at the time of the drying is preferably 40° C. or higher, more preferably 45° C. or higher and particularly preferably 50° C. or higher from the viewpoint of efficiently removing the solvent and a low-molecular-weight compound from the slurry for power storage device, and the upper limit is preferably 90° C. or lower and more preferably 80° C. or lower from the viewpoint of suppressing the deformation of the base material due to heat.

The lower limit of the drying time is preferably five seconds or longer, more preferably 10 seconds or longer and particularly preferably 15 seconds or longer, and the upper limit is preferably three minutes or shorter and more preferably two minutes or shorter. When the drying time is set to the lower limit of the above-described range or longer, the solvent may be sufficiently removed, and thus it is possible to improve the output characteristics of batteries. In addition, when the drying time is set to the upper limit or shorter, the production efficiency may be increased.

The method for producing the separator for power storage device may include an arbitrary step other than the coating step and the drying step. The method for producing the separator for power storage device may include a pressure treatment step of a layer of the slurry for power storage device (coating layer) by pressing such as mold pressing or roll pressing. The pressure treatment makes it possible to improve the bonding property between the base material and the layer of the slurry for power storage device. Here, from the viewpoint of holding the porosity of the layer of the slurry for power storage device within a preferable range, it is preferable to appropriately control the pressure and the pressing time so as not to become excessively high and long. In addition, in order to remove residual moisture, the method for producing the separator for power storage device may include a step of drying the slurry by vacuum drying, in a drying room or the like.

The separator for power storage device may be used as a battery separator, a non-aqueous secondary battery separator, a lithium ion battery separator, a sodium ion battery separator or the like.

[Separator/Electrode Laminate for Power Storage Device: Also Referred to as Separator/Electrode Laminate]

The present disclosure provides a separator/electrode laminate for power storage device having a dried substance of the slurry for power storage device on an active material side of an electrode. The separator/electrode laminate for power storage device may be obtained by applying and drying the slurry for power storage device on an electrode.

As the electrode that is used at the time of producing the separator/electrode laminate for power storage device, a variety of well-known electrodes may be used, and the electrode may be the electrode that is provided by the present disclosure or may not be the electrode that is provided by the present disclosure.

As a method for producing the separator/electrode laminate for power storage device, a method including a step of applying, drying and pressing an electrode material-containing slurry such as the slurry for power storage device on a current collector, and a step of applying and drying the slurry for power storage device on the dried substance of the electrode material-containing slurry (that is, not on the current collector side but on the electrode active material side) and the like are exemplified. As an application method, a drying method, conditions and the like, what has been described above and the like are exemplified.

The separator/electrode laminate for power storage device may be used as a battery separator/electrode laminate, a battery separator/negative electrode laminate, a battery separator/positive electrode laminate, a non-aqueous secondary battery separator/electrode laminate, a non-aqueous secondary battery separator/negative electrode laminate, a non-aqueous secondary battery separator/positive electrode laminate, a lithium ion battery separator/electrode laminate, a lithium ion battery separator/negative electrode laminate, a lithium ion battery separator/positive electrode laminate, a sodium ion battery separator/electrode laminate, a sodium ion battery separator/negative electrode laminate, a sodium Ion battery separator/positive electrode laminate and the like.

[Power Storage Device]

The present disclosure provides a power storage device including one or more selected from the group consisting of the electrode for power storage device, the separator for power storage device and the separator/electrode laminate for power storage device.

(Electrolytic Solution)

The power storage device contains an electrolytic solution. As the electrolytic solution, non-aqueous electrolytic solutions containing a supporting electrolyte dissolved in a non-aqueous solvent and the like are exemplified. The non-aqueous electrolytic solutions may contain a film-forming agent.

One non-aqueous solvent may be used singly or two or more non-aqueous solvents may be jointly used. As the non-aqueous solvent, chain carbonate solvents such as diethyl carbonate, dimethyl carbonate and ethyl methyl carbonate; cyclic carbonate solvents such as ethylene carbonate, propylene carbonate and butylene carbonate; chain ether solvents such as 1,2-dimethoxyethane; cyclic ether solvents such as tetrahydrofuran, 2-methyltetrahydrofuran, sulfolane and 1,3-dioxolane; chain ester solvents such as methyl formate, methyl acetate and methyl propionate; cyclic ester solvents such as γ-butyrolactone and γ-valerolactone; acetonitrile; and the like are exemplified. Among these, combinations of a solvent mixture of a cyclic carbonate and a chain carbonate are preferable.

As the supporting electrolyte, a lithium salt or the like may be used. One lithium salt may be used singly or two or more lithium salts may be jointly used. As the supporting electrolyte, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ and the like are exemplified. Among them, $LiPF_6$, $LiClO_4$ and $CF_3SO_3Li$, which are easily dissolved in solvents and exhibit a high dissociation degree, are preferable. As the dissociation degree of the supporting electrolyte being used becomes higher, the lithium ion conductivity becomes higher, and thus the lithium ion conductivity may be adjusted by the type of the supporting electrolyte.

One film-forming agent may be used singly or two or more film-forming agents may be jointly used. As the film-forming agent, carbonate compounds such as vinylene carbonate, vinyl ethylene carbonate, vinyl ethyl carbonate, methyl phenyl carbonate, fluoroethylene carbonate and difluoroethylene carbonate; alkene sulfides such as ethylene sulfide and propylene sulfide; sultone compounds such as 1,3-propanesultone and 1,4-butanesultone; acid anhydrides such as maleic anhydride and succinic anhydride; and the like are exemplified. The content of the film-forming agent in an electrolyte solution is not particularly limited, but is preferably 10 mass % or less, 8 mass % or less, 5 mass % or less and 2 mass % or less in order. When the content is set to 10 mass % or less, it becomes easy to obtain the suppression of the initial irreversible capacity, improvement in the low-temperature characteristics and the rate characteristics and the like, which are the advantages of the film-forming agent.

As the form of the power storage device, a cylinder type in which a sheet electrode and a separator are made into a spiral shape, a cylinder type having an inside-out structure in which a pellet electrode and a separator are combined together, a coin type in which a pellet electrode and a separator are laminated and the like are exemplified. In addition, the power storage device having this form may be used in an arbitrary shape such as a coin form, a cylindrical form or a square form by being accommodated in an arbitrary exterior case.

As a method for producing the power storage device, a method described in Japanese Patent Laid-Open No. 2013-089437 and the like are exemplified. A negative electrode is placed on an exterior case, an electrolytic solution and a separator are provided thereon, furthermore, a positive electrode is placed so as to face the negative electrode, and the components are fixed with a gasket and a sealing plate, whereby a power storage device may be produced.

The power storage device may be used as a battery, a non-aqueous secondary battery, a lithium ion battery, a sodium ion battery or the like.

EXAMPLES

Hereinafter, the present invention will be specifically described through examples and comparative examples. However, the description in the above-described preferable embodiment and the following examples are provided only for the exemplified purposes and not provided to limit the scope of the claims. In addition, in each of the examples and the comparative examples, unless particularly otherwise described, numerical values in the unit of "parts", "%" and the like are mass-based.

Example 1

Ion exchange water (2300 g), acrylamide (400 g, 5.63 mol) and sodium methallylsulfonate (8.05 g, 0.051 mol) were put into a reaction device including a stirrer, a thermometer, a reflux condenser and a nitrogen gas introduction pipe, oxygen in a reaction system was removed by passing a nitrogen gas, and the temperature was raised up to 50° C. 2,2'-Azobis(2-amidinopropane) dihydrochloride (trade name "NC-32" manufactured by Nippoh Chemicals Co., Ltd.) (4.0 g) and ion exchange water (30 g) were injected thereinto, the temperature was raised up to 80° C., and a reaction was performed for three hours, thereby obtaining a binder aqueous solution for power storage device. There was no insoluble matter of the polymer Unless particularly otherwise described, in the examples and the comparative examples other than Example 1, the reaction was performed in the same manner as in Example 1 except that changes were made as shown in the following table.

TABLE 1

| | AM (wt %) | SMAS (wt %) | ATBS (wt %) | Weight average molecular weight | Coatability Non-woven fabric | Coatability Current collector copper foil | Dispersion stability For separator | Dispersion stability For electrode |
|---|---|---|---|---|---|---|---|---|
| Example 1 | 99.1 | 0.9 | | 60000 | ○ | ○ | ○ | ○ |
| Example 2 | 99.8 | 0.2 | | 270000 | ○ | ○ | ○ | ○ |
| Example 3 | 99.2 | 0.3 | 0.5 | 190000 | ○ | ○ | ○ | ○ |
| Comparative Example 1 | 99.0 | 1.0 | | 40000 | x | x | x | x |
| Comparative Example 2 | 99.9 | 0.1 | | 360000 | x | x | ○ | ○ |
| Comparative Example 3 | 99.2 | 0.1 | 0.7 | 340000 | x | x | ○ | ○ |

Description of Abbreviations (Meth)acrylamide group-containing compound

AM: Acrylamide ("50% ACRYLAMIDE" manufactured by Mitsubishi Chemical Corporation)

Unsaturated hydrocarbon sulfonic acid and/or salt thereof

SMAS: Sodium methallylsulfonate

Unsaturated non-hydrocarbon sulfonic acid and/or salt thereof

ATBS: Acrylamido t-butylsulfonic acid ("ATBS" manufactured by Toagosei Co., Ltd.)

The measurement conditions of the weight average molecular weight of the water-soluble polymer are the following conditions.

Measuring instrument: GPC (model No.: HLC-8220) manufactured by Tosoh Corporation Columns: TSKgel guardcolum $PW_{XL}$ (manufactured by Tosoh Corporation), TSK-GEL $G2500PW_{XL}$ (manufactured by Tosoh Corporation) and TSK-GEL $GMPW_{XL}$ (manufactured by Tosoh Corporation)

Eluent: 0.1 M $NaNO_3$ aqueous solution

Calibration curve: Standard polyethylene oxide

Measuring method: The water-soluble polymer is dissolved in the eluent such that the concentration reaches 0.3 mass % and filtered, and then the physical properties are measured.

<Coatability>

The binder aqueous solution for power storage device was applied to a plastic non-woven fabric or a current collector copper foil using a bar coater. The coated non-woven fabric was evaluated with the following standards.

o: Neither coating streaks nor blurs are generated.

x: Coating streaks or blurs are generated.

<Operation Evaluation of Electrode for Power Storage Device>

(1-1) Production of Electrode for Power Storage Device Slurry

Using a commercially available planetary mixer (trade name "AWATORI RENTARO", manufactured by Thinky Corporation), the binder aqueous solution for power storage device obtained in an example (7 parts by mass in terms of the solid content), silicon particles having D50 of 5 μm (50 parts by mass) and natural graphite (trade name "Z-5F" manufactured by Ito Graphite Co., Ltd.) (50 parts by mass) were mixed in a container exclusive for the above-described mixer. Ion exchange water was added to the mixture such that the solid content concentration reached 40%, and the container was set in the mixer. Next, the mixture was kneaded at 2000 rpm for 10 minutes and defoamed for one minute, thereby obtaining an electrode for power storage device slurry.

(1-2) Production of Electrode for Power Storage Device

The electrode for power storage device slurry was uniformly applied to the surface of a current collector made of a copper foil by the doctor blade method such that the film thickness after drying reached 25 μm, dried at 60° C. for 30 minutes and then thermally treated at 150° C. in a vacuum for 120 minutes, thereby obtaining an electrode. After that, the film was pressed with a roll pressing machine such that the density of the film (electrode active material layer) reached 1.5 $g/cm^3$, thereby obtaining an electrode.

(1-3) Production of Power Storage Device

A piece obtained by blanking the electrode to a diameter of 16 mm was placed on a bipolar coin cell (manufactured by Hohsen Corp., trade name "HS Flat Cell") in an argon-substituted glove box. Next, a separator composed of a polypropylene porous film blanked to a diameter of 24 mm (CS Tech Co., Ltd., trade name "Selion P2010") was placed thereon, furthermore, an electrolytic solution (500 μL) was pour into the glove box in a manner that no air was allowed to enter, then, a piece obtained by blanking a commercially available lithium metal foil to 16 mm was placed thereon, and the exterior body of the bipolar coin cell was closed with a screw to be sealed, thereby assembling a power storage device (lithium half cell). The electrolytic solution that was used herein is a solution obtained by dissolving $LiPF_6$ in an ethylene carbonate/ethyl methyl carbonate (mass ratio=1:1) solvent in a concentration of 1 mol/L.

The power storage device having the electrode for power storage device produced using the binder aqueous solution for power storage device of the example functioned with no problems.

<Operation Evaluation of Separator for Power Storage Device>

(2-1) Production of Separator for Power Storage Device Slurry

The binder aqueous solution for power storage device obtained in an example (5 parts by mass in terms of the solid content) and water (113 parts by mass) were stirred and mixed, boehmite (average particle diameter: 0.8 μm) (100 parts by mass) was added thereto as non-conductive particles, and the components were dispersed and stirred at 15000 rpm for 60 minutes with a homogenizer (T25 digital ULTRA-TURRAX manufactured by IKA). Furthermore, ion exchange water was added thereto to adjust the viscosity, thereby producing a separator for power storage device slurry.

(2-2) Production of Separator: Lamination of Layer of Separator Slurry (Coating Layer)

A single-layer polyethylene separator base material (PE base material) that was 250 mm in width, 200 mm in length and 6 μm in thickness and produced by a wet method was prepared. The separator for power storage device slurry was applied using a gravure coater and dried on one surface of a separator such that the thickness after drying reached 3.0 μm, thereby obtaining the separator for power storage device.

(2-3) Production of Power Storage Device

A power storage device was produced by the same method as in the "(1-3) Production of power storage device" except that the separator was changed to the separator produced above.

The power storage device having the separator for power storage device produced using the binder aqueous solution for power storage device of the example functioned with no problems.

<Dispersion Stability>

After prepared, the separator slurry or the electrode slurry was stored in an oven heated to 40° C. for three days. After the electrical storage, the dispersion stability of the slurry was visually evaluated with the following standards.

o: The slurry is in a homogeneous paste form as a whole, no liquid separation occurs, and no aggregate is observed.

x: An aggregate and liquid separation are observed on the bottom part of the container.

What is claimed is:

1. A binder aqueous solution for power storage device, wherein the binder aqueous solution for power storage device contains a water-soluble polymer, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is 60,000 or more and 270,000 or less.

2. A slurry for power storage device, wherein the slurry for power storage device contains a water-soluble polymer, water and an electrode active material or a non-conductive particle, the water-soluble polymer contains more than 99 mass % and less than 99.9 mass % of a structural unit derived from a (meth)acrylamide group-containing compound and more than 0.1 mass % and less than 1 mass % of a structural unit derived from an unsaturated hydrocarbon sulfonic acid and/or a salt thereof, and a weight average molecular weight of the water-soluble polymer is 60,000 or more and 270,000 or less.

3. An electrode for power storage device comprising:

a dried substance of the slurry for power storage device according to claim 2 on a current collector.

4. A separator for power storage device comprising:

a dried substance of the slurry for power storage device according to claim 2 on a base material.

5. A separator/electrode laminate for power storage device comprising:

a dried substance of the slurry for power storage device according to claim 2 on an active material side of an electrode.

6. A power storage device comprising:

the electrode for power storage device according to claim 3.

7. A power storage device comprising:

the separator for power storage device according to claim 4.

8. A power storage device comprising:

the separator/electrode laminate for power storage device according to claim 5.

* * * * *